United States Patent Office 2,824,079
Patented Feb. 18, 1958

2,824,079

VINYL CHLORIDE POLYMER COMPOSITION CONTAINING PHENYL SALICYLATE AND A BISPHENOL

Wilbur F. Fischer, Cranford, N. J., assignor to Esso Research and Engineering Company, a corporation of Delaware No Drawing. Application June 8, 1954
Serial No. 435,350

6 Claims. (Cl. 260—31.8)

This invention essentially relates to improvements in plastic compositions containing vinyl chloride polymers or copolymers, and to methods of improving the resistance of such compositions to the deleterious effects of oxygen, heat and light. In particular, this invention relates to vinyl chloride-acetate resins containing a branched-chain ester such as diisooctyl phthalate as plasticizer and a bisphenol compound such as diphenylol propane and phenyl salicylate as stabilizers.

It has previously been proposed in U. S. Patent 2,625,521, issued January 13, 1953, to Wilbur F. Fischer and David W. Young, to stabilize vinyl chloride-acetate resins, plasticized with diisooctyl phthalate, against the effects of heat by adding thereto small amounts of diphenylol propane or other bisphenol. However, subsequent work has established the fact that the presence of the bisphenol compound does not adequately protect the composition against the effects of light.

It is accordingly the principal object of the present invention to prepare a vinyl chloride-vinyl acetate composition which is stable against both heat and light.

Other objects of the present invention will be apparent from the accompanying description.

These and other objects of this invention are accomplished by adding to the plastic composition a bisphenol type of stabilizer as described in U. S. Patent 2,625,521 and a small amount of phenyl salicylate. These materials are added in proportions of 0.01 to 5% by weight of polymer each of phenyl salicylate and the bisphenol stabilizer, preferably 0.05 to 1%, more preferably 0.02 to 0.05% or 0.05 to 0.5%. The composition thus obtained possesses unexpectedly high resistance to light in addition to the heat stability imparted by the bisphenol compound. This light stabilizing effect is not simply the additive effect of the phenyl salicylate since the results obtained are greater than would be expected from the use of either the diphenylol propane or phenyl salicylate alone.

The vinyl polymers used in the present invention are the well known vinyl chloride polymers, vinyl chloride-acetate copolymers, polyvinyl chloride, polyvinylidene chloride, vinylidene chloride-vinyl chloride copolymers and similar chlorine containing aliphatic polyvinyl resins.

These resins are suitably plasticized by means of various high-boiling esters, which have been employed in the art for this purpose. Dibutyl phthalate and di-n-octyl phthalate have been among the esters used, but branched-chain alkyl esters such as those obtained by the esterification of phthalic acid or anhydride, phosphoric acid, adipic, citric, or sebacic acid with a branched-chain alcohol of 7 to 12 carbon atoms have found particularly wide acceptance in the art because of their non-fugitivity, high plasticizing action and low-temperature effectiveness. Among these, branched-chain octyl esters of phthalic, phosphoric, adipic and sebacic acid are probably the ones most prevalently used.

The most important alcohols used in the preparation of these esters are 2-ethylhexyl alcohol and the synthetic isooctyl alcohol produced by the well-known Oxo process. A typical commercial isooctyl alcohol of the latter kind may consist of about 25% 4,5-dimethyl hexanol, 30% 3,5-dimethyl hexanol, 20% 3,4-dimethyl hexanol, 15% 3-methyl heptanol and/or 5-methyl heptanol and about 10% of other isomers. It will be seen that the synthetic alcohol consists of isomers having at least one tertiary carbon atom, and actually contains a great preponderance, or at least 60 to 85%, of isomers having two tertiary carbon atoms.

Illustrative descriptions of the Oxo process and its principles can be found, for instance, in U. S. Patent 2,327,066 and in the U. S. Bureau of Mines Publication R1 4270 "Critical Review of Chemistry of the Oxo Synthesis (1948)." Description of various typical esters derived from the Oxo alcohols and the preparation of the former, can be found in U. S. patent application Serial No. 91,424 of Smith and Young, filed on May 4, 1949, which is incorporated herein by reference.

The preferred bisphenol stabilizer useful in this invention is 2,2-bis(4-hydroxyphenyl) propane,

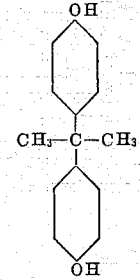

hereafter referred to simply as diphenylol propane. Similarly, other bisphenol compounds which are more or less effective can best be described by the formula

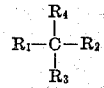

wherein $R_1$ is an alkyl radical of 1 to 4 carbon atoms, $R_2$ is an alkyl radical of 1 to 2 carbon atoms, and $R_3$ and $R_4$ are hydroxyphenyl groups, monochlorinated hydroxyphenyl groups or monoalkylated groups having 1 to 3 carbon atoms per alkyl group. In general, stabilizer compounds wherein $R_3$ and $R_4$ represent p-hydroxyphenyl groups are most advantageous. Representative compounds of this class are 2,2-bis(4-hydroxyphenyl) butane; 3,3-bis(4-hydroxyphenyl) hexane; 2,2-bis(4-hydroxy-3-methylphenyl) propane; 2,2-bis(4-hydroxy-3-isopropyl phenyl)propane; 2,2-bis(2-hydroxy-5-chlorophenyl) butane; as well as related substances wherein the two phenol groups are linked together by means of a sulfide group, —S—, or sulfoxide group,

instead of the alkylidene radical

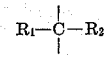

shown in the above formula. Useful bisphenol compounds having such a sulfur linkage include bis(2-hydroxy-5-methylphenyl) sulfide, bis(2-hydroxy-5-chlorophenyl) sulfide, and bis(2-hydroxy-5-methylphenyl) sulfoxide.

Useful compounds of the class described are prepared by condensing in a known manner two mols of phenol or an alkylated phenol such as a cresol with one mol of a ketone such as acetone, methyl ethyl ketone, methyl isobutyl ketone or ethyl butyl ketone. The chlorinated bisphenols are best obtained by chlorination of the appropriate condensation product. Similarly, the sulfur-linked bisphenols can be obtained in a known manner by condensing two mols of phenol with sulfur dichloride or thionyl chloride.

The compounds described above must be distinguished from more or less related phenolic compounds wherein the phenol groups contain more than one alkyl substituent as in 2,6-di-tert-butyl-4-methyl phenol or 2,2-bis(2-hydroxy-3-t-butyl-5-methyl-phenyl) propane. The polysubstituted phenolic compounds are unsuited for the purposes of the present invention not only because of their inherent yellow or even brown color but also because the alkyl substituents block the stabilizing action of the bisphenol compounds of the present inventon. A possible explanation for the unusual effectiveness of the latter compounds may be found in their ability to alkylate onto polyvinyl chloride type molecules when hydrogen chloride is split off during aging. Thus a saturated structure is retained even after the hydrogen chloride is split off, whereas in the absence of the bisphenol stabilizer the hydrogen chloride split off gives rise to a relative unstable olefinic linkage which opens up the resin molecule to further attack.

The compounds of the present invention must also be distinguished from the somewhat similar bisphenol compounds obtainable by condensation of a phenol with an aldehyde. In the latter instance the resulting condensation products are less effective, probably due to their high-molecular weight fractions, e. g., fractions comprising polymeric molecules produced by condensation of more than two mols of phenol and one mol of aldehyde.

Phenyl salicylate is easily prepared from salicylic acid and phenol in the presence of phosphoryl chloride as the catalyst.

The present invention, relating to the stabilization of polyvinyl chloride type compositions containing 20 to 80, or preferably 30 to 60 parts of an alkyl ester plasticizer per 100 parts of the polyvinyl resin, is further illustrated by the subsequent specific examples.

EXAMPLE I

A total of five blends were made on a rubber mill at a temperature of 300° F. according to the formulas listed in Table I. In each case when a uniform blend was obtained, it was molded at 320° F. into a number of 6″ x 6″ x 0.075″ test pads. Test specimens cut from these pads were then subjected to accelerated heat-aging for 4 and 7 days in a circulating-air oven maintained at 212° F. Other test samples were light-aged for periods of 500 and 900 hours in a weatherometer where they were exposed to the action of U. V. light and intermittent water spray. The appearance and other important physical properties of the samples before and after aging, as indicated above, are shown in Table I.

*Table I*

| Formula No. | 1 | 2 | 3 | 4 | 5 |
| --- | --- | --- | --- | --- | --- |
| Polyvinyl Chloride Resin | 100.0 | 100.0 | 100.0 | 100.0 | 100.0 |
| Di-2-Ethyl Hex. Phthalate | 50.0 | | | | |
| Diisooctyl Phthalate | | 50.0 | 50.0 | 50.0 | 50.0 |
| Vanstay [1] | 2.0 | 2.0 | 2.0 | 2.0 | 2.0 |
| Lead Stearate | 1.0 | 1.0 | 1.0 | 1.0 | 1.0 |
| Diphenylol Propane | | | 0.05 | 0.05 | |
| Salol [2] | | | | 1.0 | 1.0 |
| Original Properties: | | | | | |
| Tens.—Elong | 3,080—280 | 3,100—285 | 3,175—275 | 3,155—300 | 3,090—300. |
| Mod. 100% | 2,000 | 2,035 | 2,130 | 1,950 | 1,920. |
| Heat Aged—4 Days @ 100° C.: | | | | | |
| Tens.—Elong | 2,925—240 | 2,715—170 | 3,170—230 | 3,045—275 | 3,010—250. |
| Mod. 100% | 2,185 | 2,335 | 2,360 | 2,150 | 2,240. |
| Heat Aged—7 Days @ 100° C.: | | | | | |
| Tens.—Elong | 2,835—205 | 2,600—140 | 3,015—255 | 3,035—270 | 3,040—230. |
| Mod. 100% | 2,395 | 2,450 | 2,305 | 2,230 | 2,400. |
| Percent Retained (Tens.—Elong.) | 92—73 | 84—49 | 95—93 | 96—90 | 98—77. |
| Light Aged—500 hrs.: [3] | | | | | |
| Tens.—Elong | 2,630—180 | 2,720—195 | 3,035—280 | 2,980—270 | 2,665—280. |
| Mod. 100% | 2,185 | 2,250 | 2,215 | 2,100 | 1,880. |
| Percent Retained (Tens.—Elong.) | 85—64 | 88—68 | 96—100 | 94—90 | 86—93. |
| Light Aged—900 hrs.: [3] | | | | | |
| Tens.—Elong | 2,200—155 | 2,340—170 | 2,500—190 | 2,700—280 | 2,490—205. |
| Mod. 100% | 2,000 | 2,130 | 2,100 | 1,975 | 2,050. |
| Percent Retained (Tens.—Elong.) | 71—55 | 75—60 | 79—69 | 86—93 | 81—68. |
| Visual Observations | translucent, many brown opaque spots. | white opaque, many brown opaque spots. | translucent, no surface defects. | translucent, no surface defects. | translucent, no surface defects. |

[1] Sodium organo phosphate.
[2] Phenyl salicylate.
[3] Atlas weatherometer.

These data show that after exposure for 900 hours in the weatherometer the vinyl film (Formula No. 4) containing diisooctyl phthalate, phenyl salicylate and diphenylolpropane retains 93% of the original elongation and a high degree of the original color. Films containing diisooctyl phthalate and either diphenylolpropane or phenyl salicylate alone (Formulas 3 and 5 respectively) showed comparable color but the extensibility of these compounds is markedly poorer (69 and 68% retained elongation respectively). Furthermore, the latter compositions are not appreciably better on elongation than systems containing only resin stabilizers, e. g., Formulas 1 and 2.

The nature of the present invention having been thus fully set forth and specific examples of the same given, what is claimed as new and useful and desired to be secured by Letters Patent is:

1. A plastic composition of matter comprising a resinous vinyl chloride polymer, a neutral branched chain alkyl ester, having 7 to 13 carbon atoms per alkyl group, of a polybasic acid, and 0.01 to 5% by weight of polymer each of phenyl salicylate and a bisphenol stabilizer having the formula R—X—R′, wherein X is selected from the group consisting of 2,2-alkylidene groups having 3 to 6 carbon atoms, 3,3-alkylidene groups having 5 to 7 carbon atoms, sulfur, and sulfoxide; and wherein R and R′ are selected from the group consisting of hydroxyphenyl radicals, monochlorinated hydroxyphenyl radicals and monoalkyl substituted hydroxyphenyl radicals having 1 to 3 carbon atoms per alkyl group.

2. Composition according to claim 1 in which the bisphenol stabilizer is diphenylol propane.

3. Composition according to claim 1 in which the bisphenol stabilizer is diphenylol butane, the resinous vinyl chloride polymer is a copolymer of vinyl chloride and vinyl acetate, the phenyl salicylate and bisphenol each being present in amounts of about 0.02 to 0.5% by weight of the copolymer.

4. Composition according to claim 1 in which the polybasic acid is selected from the group consisting of dicarboxylic and tricarboxylic acids, the ester being present in amounts of about 20 to 80 parts by weight per 100 parts by weight of the polymer, the bisphenol stabilizer being 2,2-di(para hydroxy phenyl) propane, the phenyl salicylate and bisphenol each being present in amounts of about 0.05 to 1.0% by weight of the polymer.

5. A plastic composition of matter comprising 100 parts of a resinous copolymer of 80 to 97% combined vinyl chloride and 20 to 3% of combined vinyl acetate, 30 to 60 parts of a neutral octyl ester of a dibasic organic acid having two tertiary carbon atoms per octyl radical and having 6 to 10 carbon atoms per acyl radical, 0.02 to 0.5 part each of phenyl salicylate and 2,2-bis(4-hydroxyphenyl) propane.

6. A composition of matter according to claim 5 wherein the ester consists essentially of dimethyl hexyl phthalate isomers.

References Cited in the file of this patent

UNITED STATES PATENTS

| | | |
|---|---|---|
| 2,157,068 | Carruthers | May 2, 1939 |
| 2,625,521 | Fischer | Jan. 13, 1952 |